US009865035B2

(12) United States Patent
Donovan

(10) Patent No.: US 9,865,035 B2
(45) Date of Patent: Jan. 9, 2018

(54) IMAGE SCALING TECHNIQUES

(71) Applicant: Walter E. Donovan, Saratoga, CA (US)

(72) Inventor: Walter E. Donovan, Saratoga, CA (US)

(73) Assignee: NVIDIA CORPORATION, Santa Clara, CA (US)

(*) Notice: Subject to any disclaimer, the term of this patent is extended or adjusted under 35 U.S.C. 154(b) by 0 days.

(21) Appl. No.: 14/843,974

(22) Filed: Sep. 2, 2015

(65) Prior Publication Data

US 2016/0063676 A1   Mar. 3, 2016

Related U.S. Application Data

(60) Provisional application No. 62/044,548, filed on Sep. 2, 2014.

(51) Int. Cl.
G06K 9/00 (2006.01)
G06T 3/40 (2006.01)

(52) U.S. Cl.
CPC .................. *G06T 3/4007* (2013.01)

(58) Field of Classification Search
CPC ........ H04N 5/142; H04N 5/145; H04N 7/012; H04N 7/014; H04N 7/0142; H04N 19/523; H04N 2209/046; G06T 3/4007; G06T 3/4015; G06T 3/403; G06T 5/002; G06T 5/50; G06T 2207/10016; G06T 2207/20021; G06T 2207/20182
See application file for complete search history.

(56) References Cited

U.S. PATENT DOCUMENTS

| | | | |
|---|---|---|---|
| 5,103,490 | A | 4/1992 | McMillin |
| 5,534,934 | A | 7/1996 | Katsumata et al. |
| 5,537,149 | A | 7/1996 | Teraoka et al. |
| 5,734,744 | A | 3/1998 | Wittenstein et al. |
| 5,790,705 | A | 8/1998 | Anderson et al. |
| 5,872,902 | A | 2/1999 | Kuchkuda et al. |
| 5,953,691 | A | 9/1999 | Mills |
| 6,026,180 | A | 2/2000 | Wittenstein et al. |
| 6,181,822 | B1 | 1/2001 | Miller et al. |
| 6,356,588 | B1 | 3/2002 | Otto |
| 6,518,974 | B2 | 2/2003 | Taylor et al. |
| 6,538,658 | B1 | 3/2003 | Herrera |
| 6,757,022 | B2 | 6/2004 | Wredenhagen et al. |
| 6,825,851 | B1 | 11/2004 | Leather |
| 6,828,987 | B2 | 12/2004 | Swan |
| 6,868,189 | B1 | 3/2005 | Hoshino |
| 6,933,954 | B2 | 8/2005 | Senior et al. |
| 6,958,780 | B1 | 10/2005 | Kawai |
| 6,970,204 | B1 | 11/2005 | Aida et al. |
| 7,039,241 | B1 | 5/2006 | Van Hook |

(Continued)

FOREIGN PATENT DOCUMENTS

CN 101197957 6/2008
JP 2002064760 4/1991

(Continued)

Primary Examiner — Jose Couso

(57) ABSTRACT

Image scaling techniques, in accordance with embodiments of the present technology, include directionally interpolating blocks of pixel data of an image, sharpening the directional interpolated blocks of pixel data, and optionally clamping the sharpened, directional interpolated blocks of pixel data.

19 Claims, 11 Drawing Sheets

(56) References Cited

U.S. PATENT DOCUMENTS

| | | | |
|---|---|---|---|
| 7,200,263 B2 | 4/2007 | Curry et al. | |
| 7,236,191 B2* | 6/2007 | Kalevo | H04N 9/045 348/222.1 |
| 7,308,146 B2 | 12/2007 | Becker et al. | |
| 7,317,827 B2 | 1/2008 | Munsil | |
| 7,511,714 B1 | 3/2009 | Amann et al. | |
| 7,565,028 B2 | 7/2009 | Saed | |
| 8,111,928 B2 | 2/2012 | Van Hook et al. | |
| 8,144,977 B2* | 3/2012 | Guarnera | G06T 3/4015 382/162 |
| 8,411,942 B2 | 4/2013 | Chen et al. | |
| 8,593,483 B2* | 11/2013 | Cote | G06T 5/002 345/611 |
| 8,767,828 B2 | 7/2014 | Ma et al. | |
| 8,942,474 B2 | 1/2015 | Werness et al. | |
| 9,218,792 B2 | 12/2015 | Dutta et al. | |
| 2002/0061063 A1 | 5/2002 | Otto | |
| 2002/0145610 A1 | 10/2002 | Barilovits et al. | |
| 2003/0001868 A1 | 1/2003 | Sack et al. | |
| 2003/0030653 A1 | 2/2003 | Swan | |
| 2003/0189581 A1 | 10/2003 | Nasoff et al. | |
| 2003/0201994 A1 | 10/2003 | Taylor et al. | |
| 2003/0234795 A1 | 12/2003 | Lee | |
| 2004/0049497 A1 | 3/2004 | Curry et al. | |
| 2004/0075671 A1 | 4/2004 | Vale et al. | |
| 2004/0105015 A1 | 6/2004 | Tsukioka | |
| 2004/0119886 A1 | 6/2004 | Cook et al. | |
| 2004/0145595 A1 | 7/2004 | Bennett | |
| 2004/0246257 A1 | 12/2004 | MacInnis et al. | |
| 2005/0063586 A1 | 3/2005 | Munsil et al. | |
| 2005/0152610 A1 | 7/2005 | Hagiwara et al. | |
| 2006/0164441 A1 | 7/2006 | Wada et al. | |
| 2006/0215923 A1 | 9/2006 | Beatty | |
| 2006/0269134 A1 | 11/2006 | Wang et al. | |
| 2007/0070083 A1 | 3/2007 | Fouladi et al. | |
| 2007/0097261 A1 | 5/2007 | Smith et al. | |
| 2007/0132788 A1 | 6/2007 | Heo | |
| 2007/0195194 A1 | 8/2007 | Op De Beeck | |
| 2007/0198941 A1 | 8/2007 | Baar et al. | |
| 2008/0012880 A1 | 1/2008 | Plut | |
| 2008/0123945 A1 | 5/2008 | Andrew et al. | |
| 2008/0158246 A1 | 7/2008 | Ishii et al. | |
| 2009/0154818 A1 | 6/2009 | Stefanov et al. | |
| 2010/0329548 A1 | 12/2010 | Yoshimura | |
| 2011/0170609 A1 | 7/2011 | Lainema et al. | |
| 2011/0194616 A1 | 8/2011 | He et al. | |
| 2011/0242113 A1 | 10/2011 | Keall et al. | |
| 2012/0050563 A1 | 3/2012 | Cote et al. | |
| 2012/0121013 A1 | 5/2012 | Lainema et al. | |
| 2012/0213435 A1 | 8/2012 | Donovan et al. | |
| 2013/0022265 A1 | 1/2013 | Werness et al. | |
| 2014/0009576 A1 | 1/2014 | Hadzic et al. | |
| 2014/0184632 A1 | 7/2014 | Donovan | |
| 2014/0185952 A1 | 7/2014 | Cabral | |
| 2017/0237997 A1* | 8/2017 | Donovan | H04N 19/186 |

FOREIGN PATENT DOCUMENTS

| | | |
|---|---|---|
| JP | H03089678 | 4/1991 |
| JP | 2003189266 | 7/2003 |
| JP | 2005333380 | 12/2005 |
| JP | 2006135410 | 5/2006 |
| JP | 2007124232 | 5/2007 |
| JP | 2007129728 | 5/2007 |
| JP | 2008122800 | 5/2008 |
| JP | 2009162947 | 7/2009 |
| KR | 20060005578 | 1/2006 |
| KR | 20080012609 | 2/2008 |
| TW | I429274 | 3/2014 |

* cited by examiner

IMAGE SCALING TECHNIQUES

CROSS-REFERENCE TO RELATED APPLICATIONS

This application claims the benefit of U.S. Patent Provisional Application No. 62/044,548 filed Sep. 2, 2014, which is incorporated herein in its entirety.

BACKGROUND OF THE INVENTION

Computing systems, displays and other similar electronics have made significant contributions toward the advancement of modern society and are utilized in a number of applications to achieve advantageous results. Numerous devices, such as desktop personal computers (PCs), laptop PCs, tablet PCs, netbooks, smart phones, servers, televisions and the like have facilitated increased productivity and reduced costs in communicating and analyzing data in most areas of entertainment, education, business, and science. One common aspect of computing systems is the display of images and the ability of scale images (e.g., enlarge) thereon.

There are numerous techniques for upscaling images on electronic devices. However the current state of the art suffers from the speed of the techniques for scaling the images and/or the resulting quality of the scaled images. Accordingly there is a continuing need for image scaling techniques that provide very good quality image scaling along with faster performance.

SUMMARY OF THE INVENTION

The present technology may best be understood by referring to the following description and accompanying drawings that are used to illustrate embodiments of the present technology directed toward image scaling techniques.

In one embodiment, a method of image scaling includes directionally interpolating a plurality of blocks of pixel data of a received image. The directional interpolated blocks of pixel data are color sharpened. The color sharpened, directional interpolated blocks of pixel data are luminance clamped to produce a scaled image.

In another embodiment, a method of image scaling includes directionally interpolating a plurality of blocks of pixel data of a received image. The directional interpolated blocks of pixel data are sharpened to produce a scaled image.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
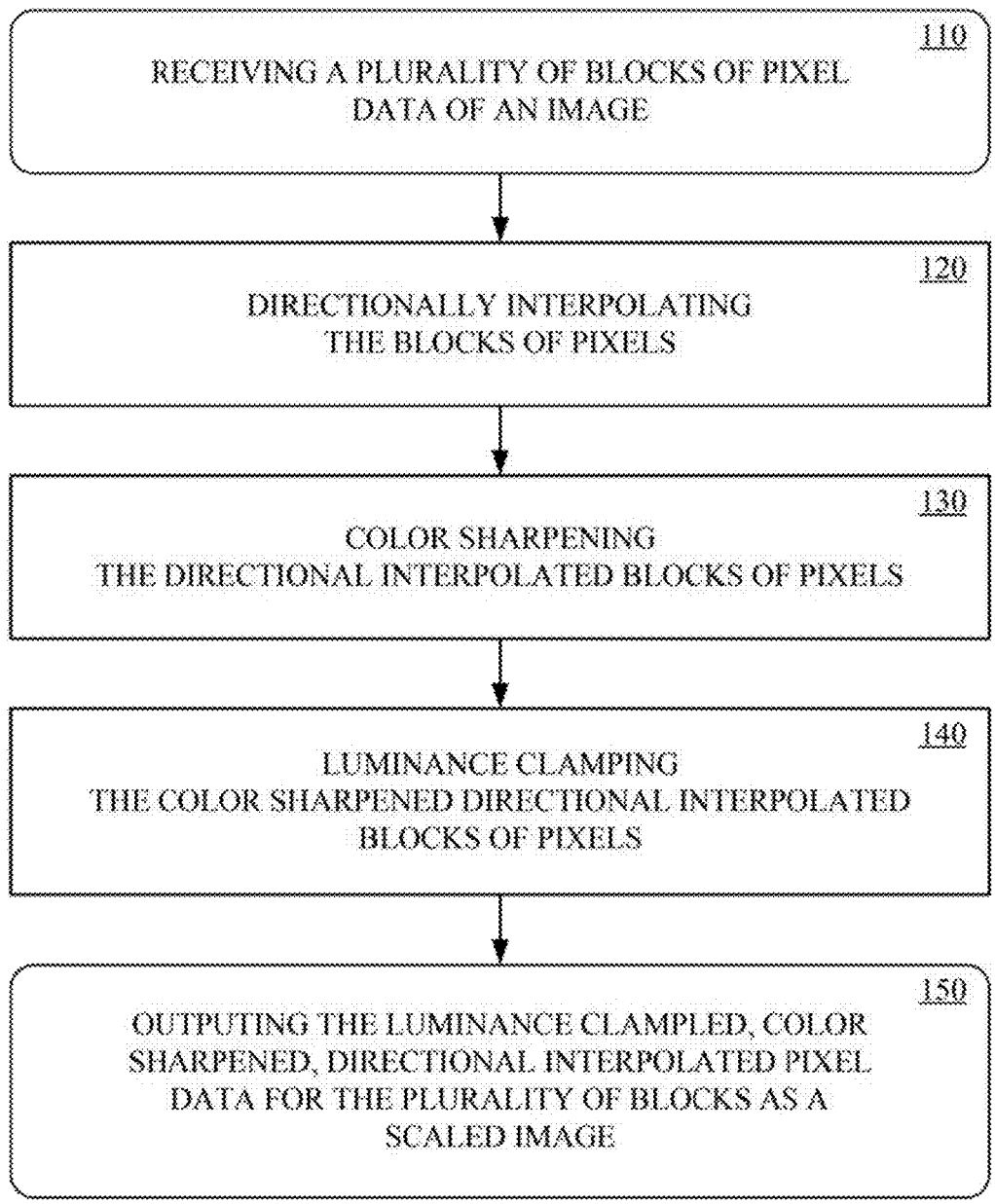
FIG. 1 shows a flow diagram of a method of image scaling, in accordance with an embodiment of the present technology.

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. It is also to be understood that the phraseology and terminology used herein is for the purpose of description and should not be regarded as limiting.

Referring to FIG. 1, a method of image scaling, in accordance with an embodiment of the present technology, is shown. The method may be implemented as computing device-executable instructions (e.g., computer program) that are stored in one or more computing device-readable media (e.g., computer memory) and executed by one or more computing devices (e.g., graphics processing unit).

The method begins with receiving a plurality of blocks of pixel data of an image, at 110. The blocks of pixel data include a given number of pixel values per block. In one implementation, the blocks of pixel data include values of a 4×4 array of pixels. At 120, directional interpolation is performed on each block of pixel data.

In one implementation, direction interpolation includes applying a directional non-liner filter D(Image, m), which upscales by a factor of 2, to the block of pixel values.

Figure 2A:
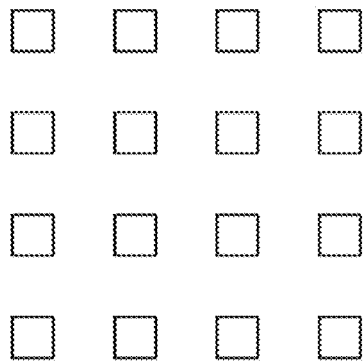
FIGS. 2A, 2B, 2C, 2D, 2E and 2F show diagrams of pixel blocks illustrating aspects of directional interpolation, in accordance with embodiments of the present technology.
Figure 2B:
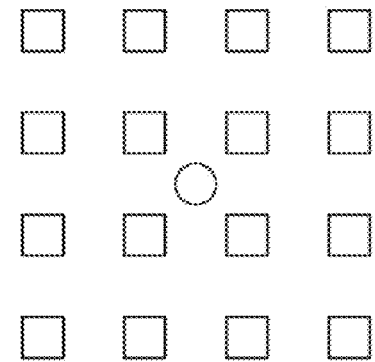
Figure 2C:
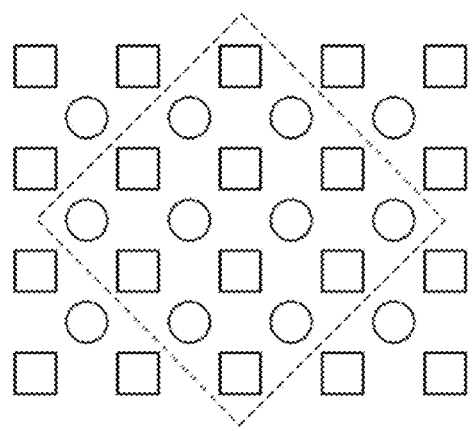
Figure 2D:
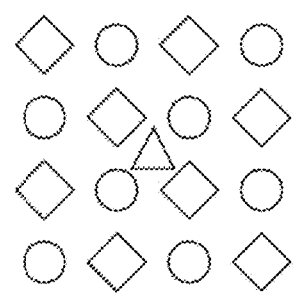
Figure 2E:
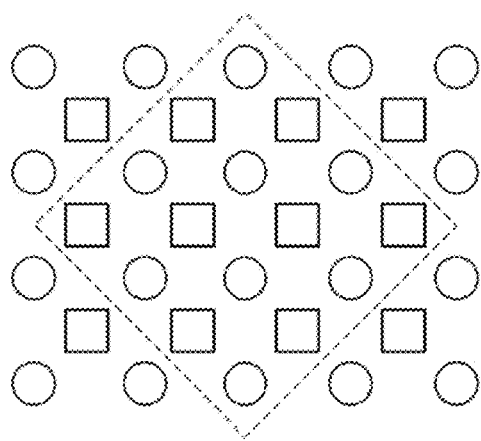
Figure 2F:
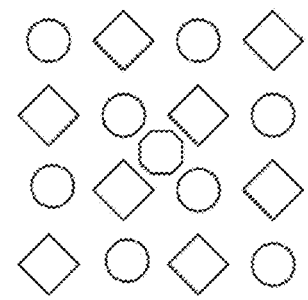

In a second implementation, values are interpolated from each 4×4 grid of pixel values, as illustrated in FIGS. 2A and 2B. The same algorithm is also applied to interpolate values after the grid is rotated to the left by 45 degrees, as illustrated in FIGS. 2C and 2D. The same algorithm is also applied to interpolate values after the grid is rotated to the right by 45 degrees, as illustrated in FIGS. 2E and 2F. The squares represent the original pixel values, the circles represent interpolated value on the original grid, the triangle represent the interpolated value for the grid rotated to the left by 45 degrees, and the octagon represent the interpolated value for the grid rotated to the right by 45 degrees. Accordingly, ever original pixel (e.g., square) will generate three additional pixels (one circle, one triangle and one octagon).

Figure 3A:
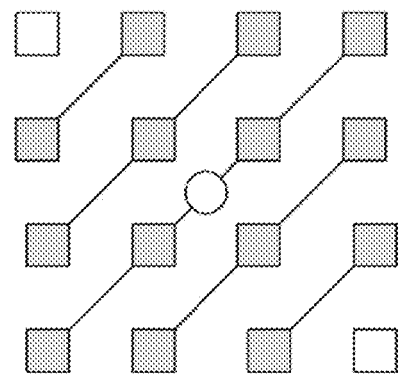
FIGS. 3A and 3B show diagrams of pixel blocks illustrating aspects of directional interpolation, in accordance with embodiments of the present technology.
Figure 3B:
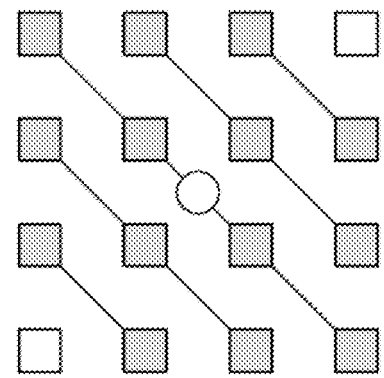

For each interpolation, the sum of the absolute differences, of the pixel luminances, of left and right diagonal original pixels values, are calculated according to metric equations 1 and 2, and illustrated in FIGS. 3A and 3B.

$$M_{45} = \sum_{45° \text{ pairs } i,j} |lum_i - lum_j| \quad (1)$$

$$M_{135} = \sum_{135° \text{ pairs } i,j} |lum_i - lum_j| \quad (2)$$

Wherein the luminance is Y'601: 0.299R+0.587G+0.114 B.

Note the metric equations 1 and 2 may be thought of as convolving the image with the kernels according to 3 and 4, $$\text{abs} \otimes \left( \begin{bmatrix} 1 & 0 \\ 0 & -1 \end{bmatrix} \right) \quad (3)$$

-continued $$\text{abs} \otimes \left( \begin{bmatrix} 0 & 1 \\ -1 & 0 \end{bmatrix} \right) \quad (4)$$

and then applying a box filter according to 5.

$$\begin{bmatrix} 1 & 1 & 1 \\ 1 & 1 & 1 \\ 1 & 1 & 1 \end{bmatrix} \quad (5)$$

The box filter 5 is used to smoothen the response of the kernels 3 and 4.

For example, if a 4×4 block of pixel values is noted by $$\begin{bmatrix} 03 & 13 & 23 & 33 \\ 02 & 12 & 22 & 32 \\ 01 & 11 & 21 & 31 \\ 00 & 10 & 20 & 30 \end{bmatrix} \quad (6)$$

The convolution may be calculated as sum of differences of luminance of the diagonal pixels |02−13|+|01−12|+|12−23|+|00−11|+|11−22|+|22−33|+|10−21|+|21−32|+|20−31| for the left diagonals, and |01−10|+|20−11|+|11−02|+|30−21|+|21−12|+|12−03|+|31−22|+|22−13|+|32−23| for the right diagonals.

Figure 4:
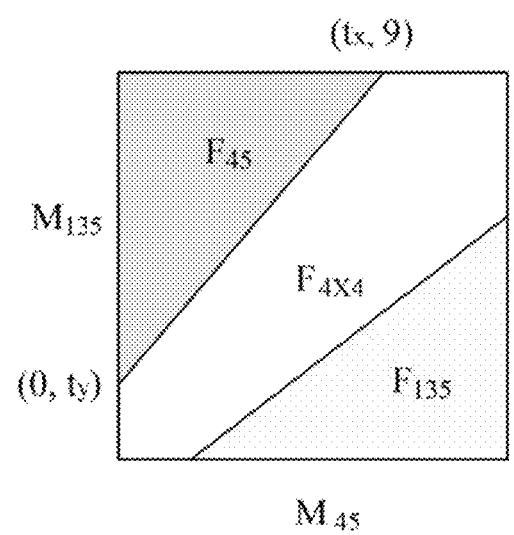
FIG. 4 shows a diagram illustrating aspects of possible interpolation directions, in accordance with embodiments of the present technology.
Figure 5A:
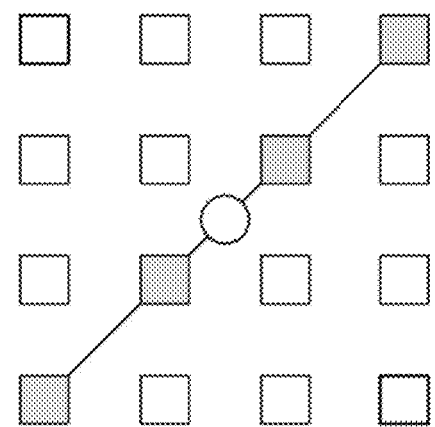
FIGS. 5A, 5B and 5C show diagrams of pixel blocks illustrating aspects of directional interpolation, in accordance with embodiments of the present technology.
Figure 5B:
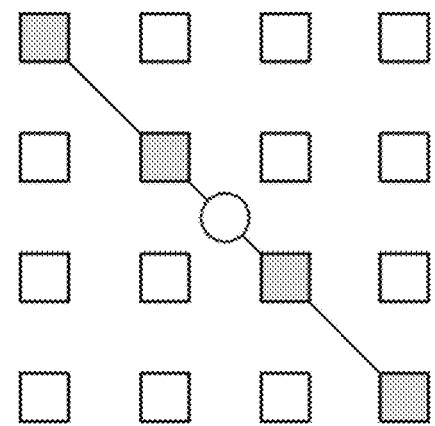
Figure 5C:
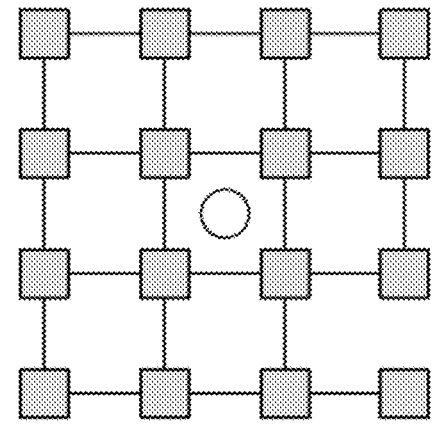
Figure 6A:
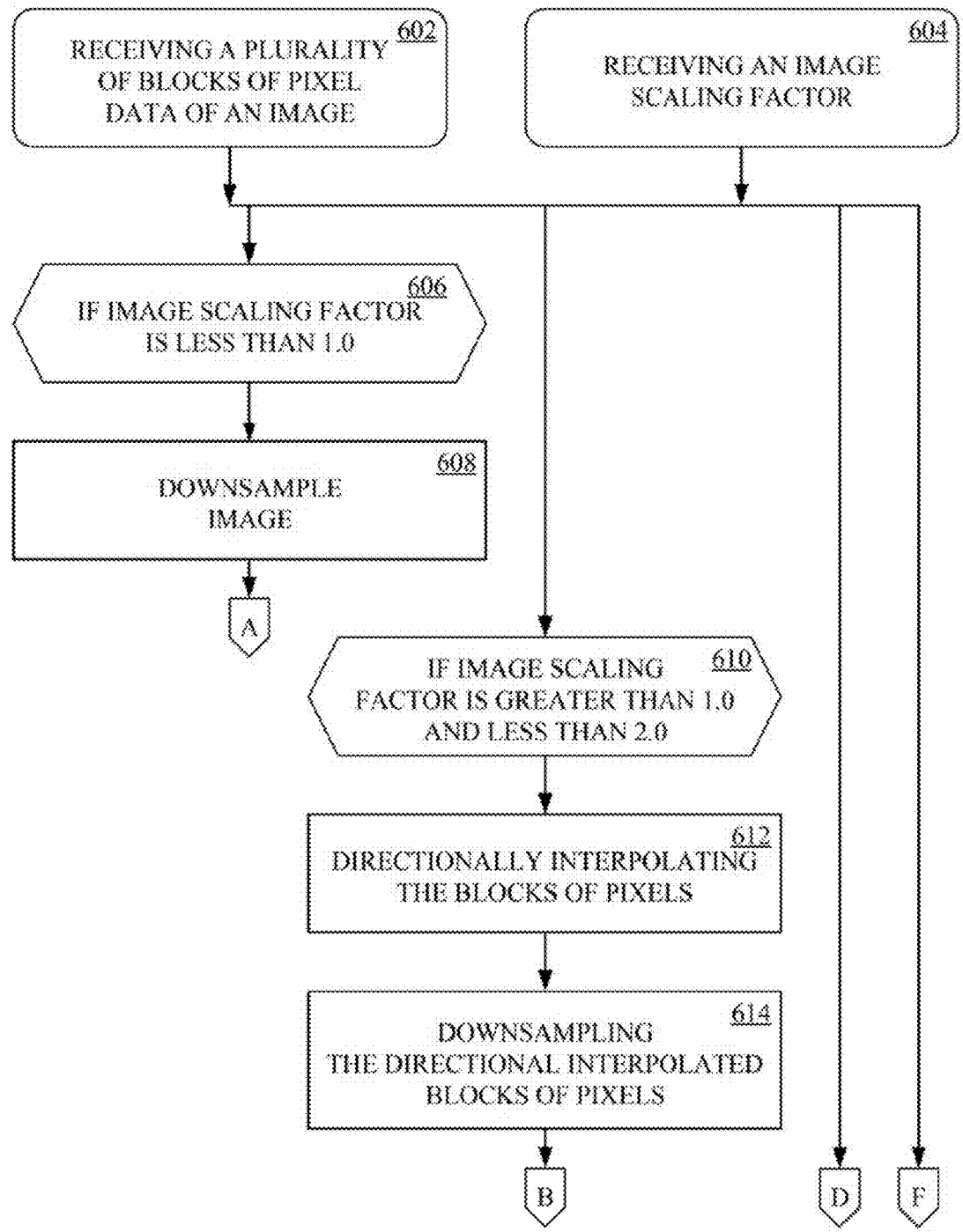
FIGS. 6A, 6B, 6C and 6D shows a flow diagram of a method of image scaling, in accordance with another embodiment of the present technology.
Figure 6B:
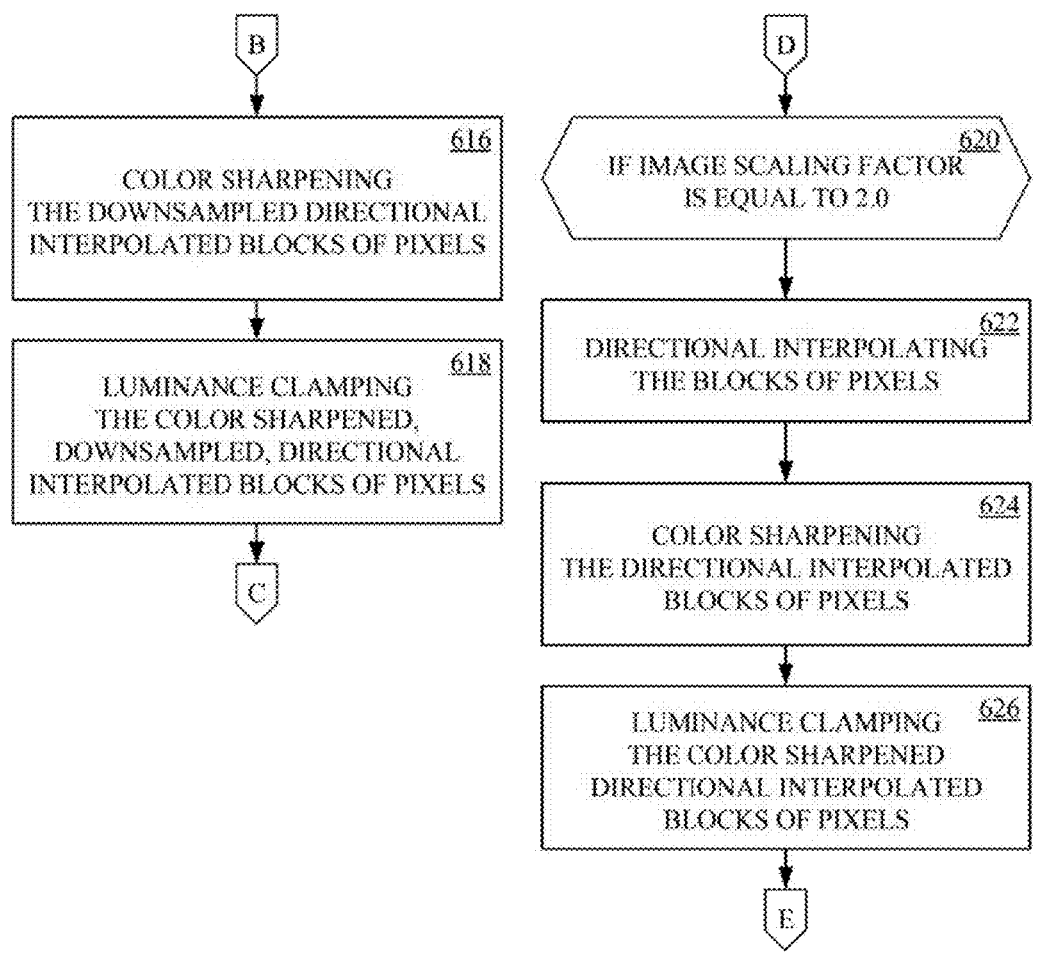
Figure 6C:
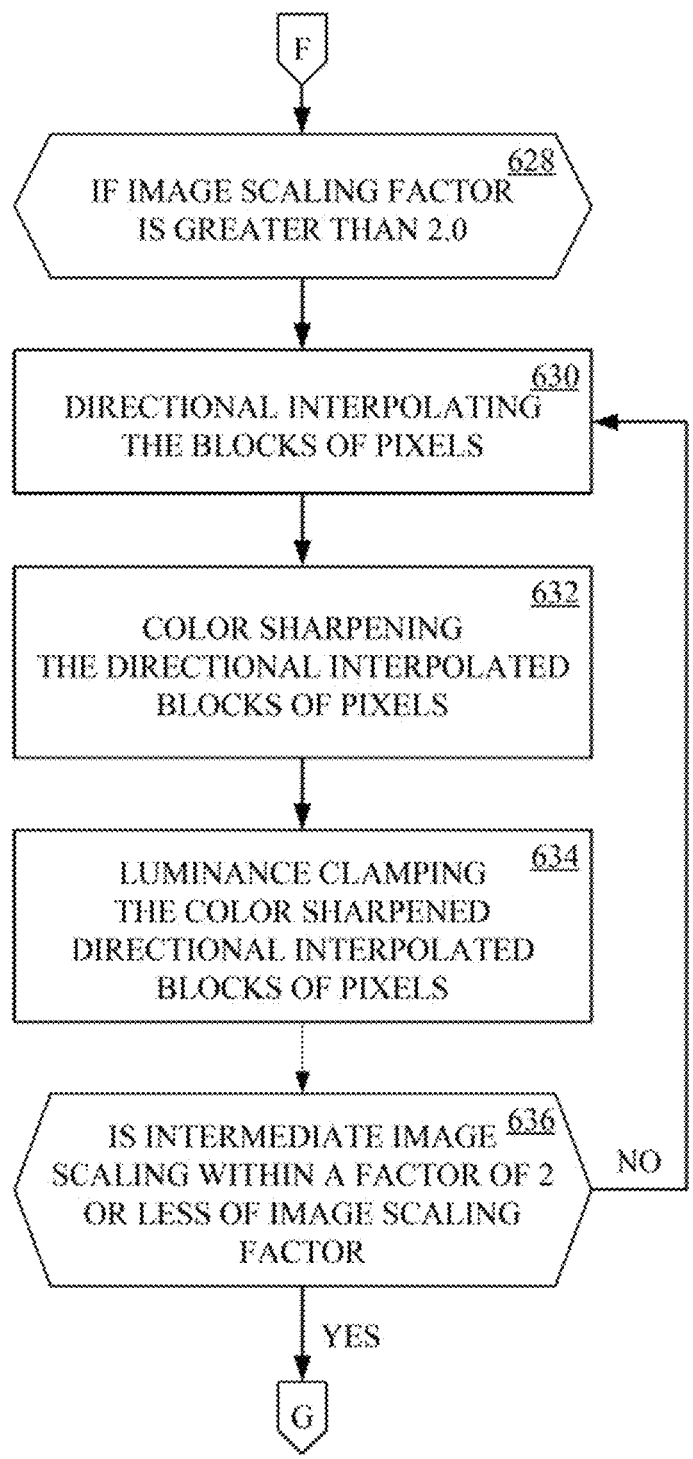
Figure 6D:
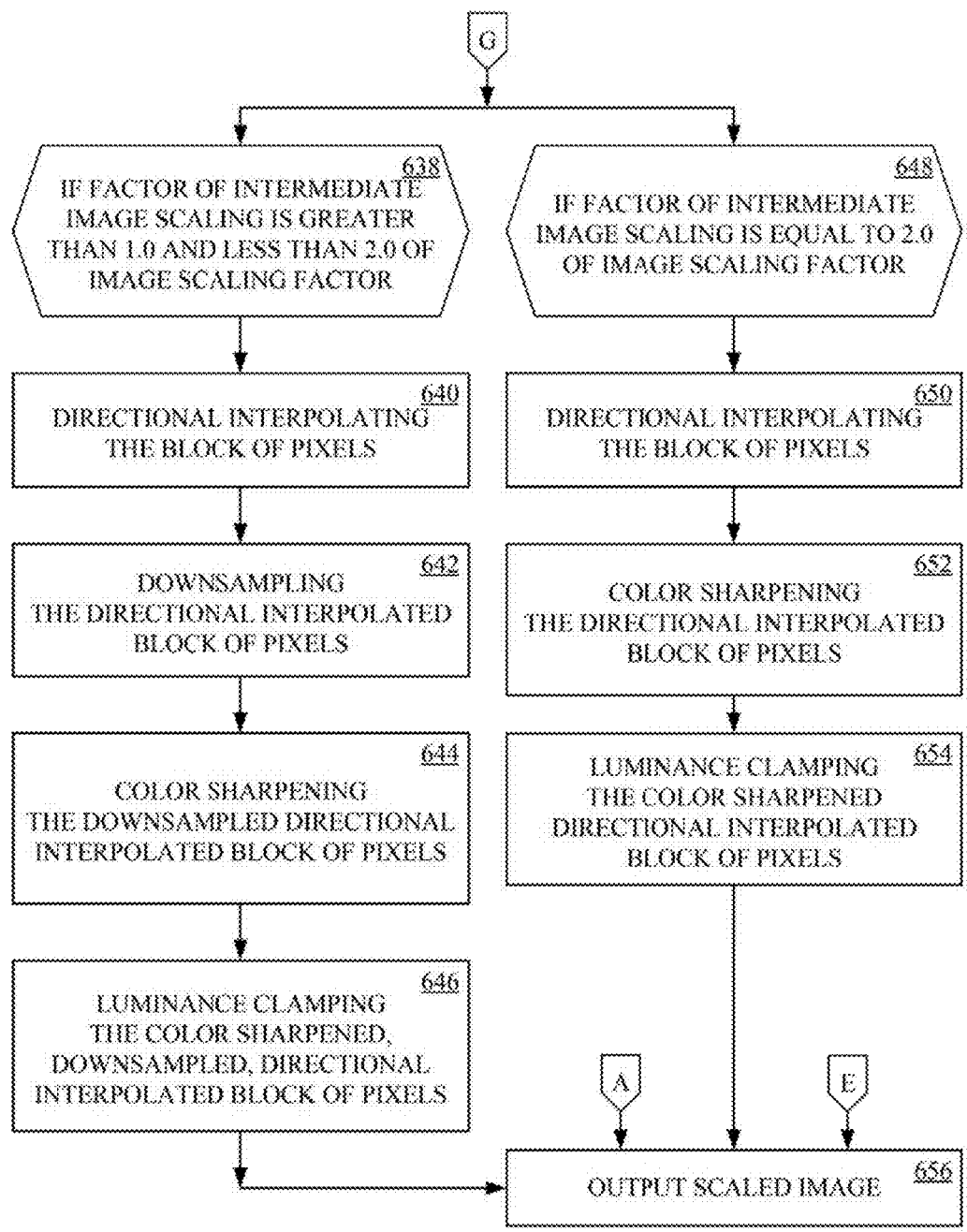

If a given metric is small, the image is isophotic in that corresponding direction. The given block of pixels is interpolated in the direction of the dominant isophote thereof. If no direction dominates, a standard linear filter is used to directionally interpolate the given block of pixels. Thus, given the two metric in the range [0,9], the graph of FIG. 4 may be used to classify the metrics into three possible interpolation directions 7, 8 and 9, $$F_{45}: \text{ if } (aM_{45}+bM_{135}+c<0) \quad (7)$$

$$F_{135}: \text{ if } (bM_{45}+aM_{135}+c<0) \quad (8)$$

$$F_{4\times4}: \text{ otherwise} \quad (9)$$

and as illustrated in FIGS. 5A, 5B and 5C respectively. The interpolation direction may use Lanczos-windowed sine weights [−1 9 9 −1]/16. For the 4×4 array, the same weight as the separable filter may be used. The constants a, b and c may be calculated from the parameters tx and ty according to equations 10, 11 and 12, respectively.

$$a=(9-ty) \quad (10)$$

$$b=tx \quad (11)$$

$$c=tx \cdot ty \quad (12)$$

The parameters tx and ty, both in [0,9], are tunable parameters. Reasonable values are tx=8.1 and ty=0.1.

At 130, color sharpening is performed on each block of directional interpolated pixel values. The color sharpening includes applying non-linear sharpening filter. In one implementation the sharpening filter 13 may be $$\begin{bmatrix} -1 & -2 & -1 \\ -2 & 12 & -2 \\ -1 & -2 & -1 \end{bmatrix} + \begin{bmatrix} 0 & 0 & 0 \\ 0 & 1 & 0 \\ 0 & 0 & 0 \end{bmatrix} \quad (13)$$

In one implementation, the YPbPr color space is used. In one implementation, sharpening filter in the range 0.10 to 0.16 seems to look best. Note that the sharpening filter can be computed as a separable filter followed by a multiply-add.

At 140, luminance clamping is performed on each block of color sharpened directional interpolated pixel values. In one implementation, the luminance may be clamped to the luminance range of the original 3×3 neighborhood. At 150, plurality of blocks of luminance clamped, color sharpened, directional interpolated pixel values are output as an enlarged image. In one implementation, the plurality of blocks of luminance clamped, color sharpened, directional interpolated values are output on a display for visual presentation to a user. For example embodiments may advantageously be used to enlarge beck buffers to improve the performance of GPUs, during real time gaming or video scaling, running on 4K or larger displays. In another implementation, the plurality of blocks of luminance clamped, color sharpened, directional interpolated values are stored in computing device-readable media (e.g., computer memory).

In addition, by sharpening the colors before clamping the luminance, embodiments of the present technology advantageously educe ringing in the enlarged image.

Referring now to FIGS. 6A-6D, a method of image scaling, in accordance with yet another embodiment of the present technology, is shown. The method begins with receiving a plurality of block of pixel data of an image, at 602. At 604, an image scaling factor is also received. In one implementation, let $Z=\max(x_{scale}, y_{scale})$ be the image scaling factor.

If the image scaling factor Z is less than 1.0, at 606, the plurality of blocks of pixel data is downsampled, at 606. In one implementation, a Gaussian downsampling is applied as a 6×6 filter with the kernel $$e^{-x^2/2\sigma^2} \quad (14)$$

Here, $$\sigma^2 = \max(0.01, \sigma_{adj}^2 - \sigma_{in}^2) \quad (15)$$

where $$\sigma_{adj} = \sigma_{out}/Z_{downscale} \quad (16)$$

and $$\sigma_{out}, \sigma_{in} \quad (17)$$

are the desired output blurriness and the estimated input blurriness, respectively. Generally, $$\sigma_{out} = \sigma_{in} = 0.5 \quad (18)$$

and $$0.5 < Z_{downscale} < 1.0 \quad (19)$$

The downsampled plurality of blocks of pixel data is output as the scaled image, at 656.

If the image scale factor Z is greater than 1.0 and less than 2.0, at 610, the plurality of blocks of pixels are directionally interpolated, at 612. The pixel blocks may be directionally interpolated as described above with reference to process 120. At 614, the directional interpolated block of pixels are downsampled. In one implementation, downsampling may be performed as described above with reference to process 608. At 616, the downsampled, directional interpolated pixel blocks are color sharpened. Color sharpening may be performed as described above with reference to process 130. At 618, the color sharpened, downsampled, directional interpolated blocks of pixel data are luminance clamped. Luminance clamping may be performed as described above with reference to processes 140. The luminance clamped, color sharpened, downsampled, directional interpolated plurality of blocks of pixel data is output as the scaled image, at 656.

If the image scale factor Z is equal to 2.0, at 620, the plurality of blocks of pixels are directionally interpolated, at 622. Again, the pixel blocks may be directionally interpolated as described above with reference to process 120. At 624, directional interpolated pixel blocks me color sharpened. Again, color sharpening may be performed as described above with reference to process 130. At 626, the color sharpened, directional interpolated blocks of pixel data are luminance clamped. Again, luminance clamping may be performed as described above with reference to processes 140. The luminance clamped, color sharpened, directional interpolated plurality of blocks of pixel data is output as the scaled image, at 656.

If the image scale factor Z is greater than 2.0, at 628, the plurality of blocks of pixels are directionally interpolated, at 630. Again, the pixel blocks may be directionally interpolated as above description with reference to process 120. At 632, directional interpolated pixel blocks are color sharpened. Again, color sharpening may be performed as described above with reference to process 130. At 634, the color sharpened directional interpolated blocks of pixel data are luminance clamped. Again, luminance clamping may be performed as described above with reference to processes 140. At 636, it is determined if the intermediate image scaling performed according to processes 630-634, is within a factor of 2.0 or less of the image scaling factor. If the intermediate image scaling is not within a factor of 2.0 or less of the image scaling factor, than processes 630-634 are iteratively repeated until the intermediate image scaling is within a factor of 2.0 or less of the image scaling factor.

If the intermediate image scaling is greater than 1.0 and less than 2.0 of the image scaling factor, at 638, the intermediate scaled block of pixels are directionally interpolated, at 640. The pixel blocks may be directionally interpolated as above description with reference to process 120. At 642, the directional interpolated block of pixels are downsampled. The downsampling may be performed as described above with reference to process 608. At 644, the downsampled, directional interpolated pixel blocks are color sharpened. Color sharpening may be performed as described above with reference to process 130. At 646, the color sharpened, downsampled, directional interpolated blocks of pixel data are luminance clamped. Luminance clamping may be performed as described above with reference to processes 140. The luminance clamped, color sharpened, downsampled, directional interpolated plurality of blocks of pixel data is output as the scaled image, at 656.

If the intermediate image scaling is equal to 2.0 of the image scaling factor, at 648, the intermediate scaled blocks of pixel are directionally interpolated, at 650. The pixel blocks may be directionally interpolated as above description with reference to process 120. At 652, the directional interpolated pixel blocks are color sharpened. Color sharpening may be performed as described above with reference to process 130. At 654, the color sharpened, directional interpolated blocks of pixel data are luminance clamped. Luminance clamping may be performed as described above with reference to processes 140. The luminance clamped, color sharpened, directional interpolated plurality of blocks of pixel data is output as the scaled image, at 656.

Figure 7:
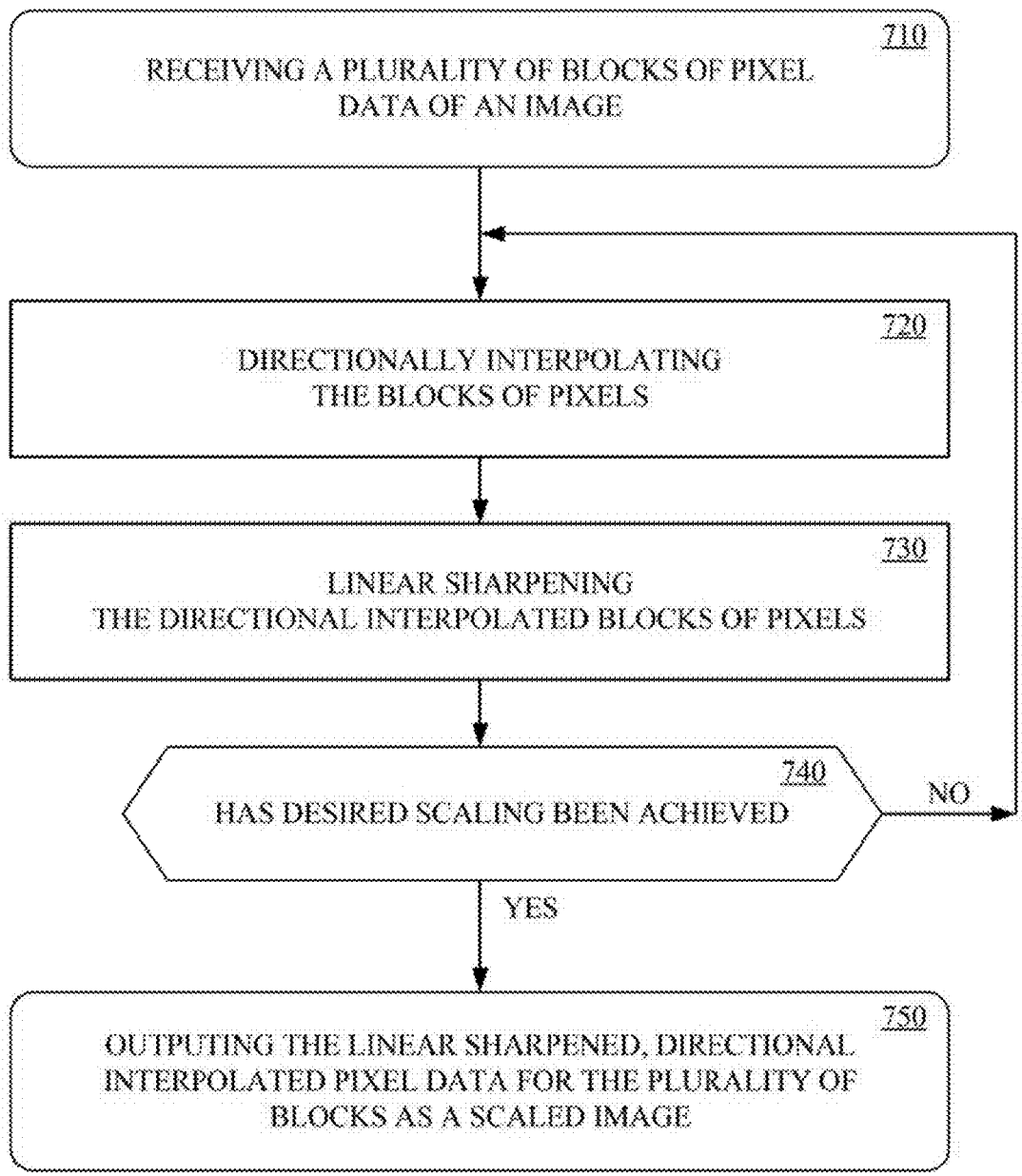
FIG. 7 shows a flow diagram of a method of image scaling, in accordance with another embodiment of the present technology.

Referring now to FIG. 7, a method of image scaling, in accordance with another embodiment of the present technology, is shown. The method begins with receiving a plurality of blocks of pixel data of an image, at 710. At 720, directional interpolation is performed on each block of pixel data.

In one implementation, values are interpolated from each 4×4 grid of pixel values, as illustrated in FIGS. 2A and 2B. The same algorithm is also applied to interpolate values after the grid is rotated to the left by 45 degrees, as illustrated in FIGS. 2C and 2D. The same algorithm is also applied to interpolate values after the grid is rotated to the right by 45 degrees, as illustrated in FIGS. 2E and 2F. The squares represent the original pixel values, the circles represent interpolated value on the original grid, the triangle represent the interpolated value for the grid rotated to the left by 45 degrees, and the octagon represent the interpolated value for the grid rotated to the right by 45 degrees. If data from outside the original image is needed, any standard texture function (e.g., clamp, mirror, wrap, border, etc.) may be used. Accordingly, ever original pixel (e.g., square) will generate three additional pixels (one circle, one triangle and one octagon).

Figure 8A:
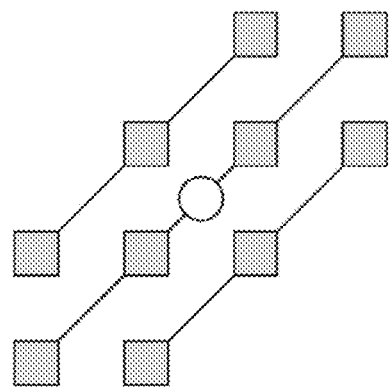
FIGS. 8A and 8B show diagrams of pixel blocks illustrating aspects of directional interpolation, in accordance with embodiments of the present technology.
Figure 8B:
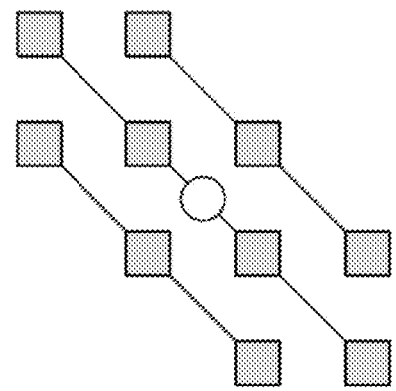

For each interpolation, the sum of the absolute differences, of the pixel luminances of left and right diagonally-adjacent original pixels values, are calculated according to metric equations 20 and 21, and illustrated in FIGS. 8A and 8B.

$$M_{45} = \sum_{45° \text{ pairs } i,j} |lum_i - lum_j| \quad (20)$$

$$M_{135} = \sum_{135° \text{ pairs } i,j} |lum_i - lum_j| \quad (21)$$

Wherein the luminance is Y709(r,g,b)=0.2126r+0.7152g+0.0722b.

Note the metric equations 20 and 21 may be thought of as convolving the image with the kernels according to 3 and 4, and then applying an averaging filer 22

$$\begin{bmatrix} 0 & 1 & 1 \\ 1 & 1 & 1 \\ 1 & 1 & 0 \end{bmatrix} \quad (22)$$

to the results.

Figure 9:
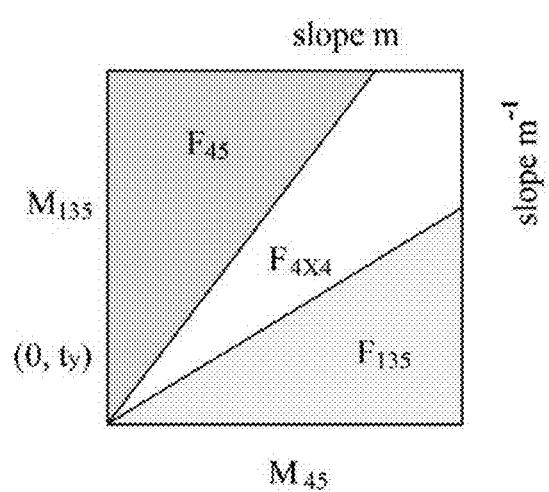
FIG. 9 shows a diagram illustrating aspects of possible interpolation directions, in accordance with embodiments of the present technology.

If a given metric is small, the image is isophotic in that corresponding direction. The given block of pixels is interpolated in the direction of the dominant isophote thereof. If no direction dominates, a standard linear filler is used to directionally interpolate the given block of pixels. The dominant direction may be determined by comparing relative magnitudes of the metrics. Thus, given the two metric, the graph of FIG. 9 may be used to classify the metrics into three possible interpolation directions 23, 24 and 25, $$F_{45}: \text{if } M_{135} > mM_{45} \quad (23)$$

$$F_{135}: \text{if } M_{45} > mM_{135} \quad (24)$$

$$F_{4\times4}: \text{otherwise} \quad (25)$$

and as illustrated in FIGS. 5A, 5B and 5C respectively. The weights for the $F_{45}$ and $F_{135}$ interpolation may be $$-\frac{1}{16}, \frac{9}{16}, \frac{9}{16}, -\frac{1}{16}.$$

For $F_{4\times4}$ the same weights may be use for the separable horizontal and vertical weights. Other weights that can be used are in the approximate range $$-\frac{1}{8}, \frac{5}{8}, \frac{5}{8}, -\frac{1}{8}, \text{ to } -\frac{1}{32}, \frac{17}{32}, \frac{17}{32}, -\frac{1}{32}.$$

When working with YUV (luminance+chroma) images, one can choose to scale the Y channel in accordance with the above described method and use any suitable linear scaling for the UV channels. Generally, this may be done if required for performance since color detail is lost. D(I,m) for single channel I is the same as the above except the channel value is used directly as the luminance.

At 730, sharpening is performed on each block of directional interpolated pixel values. In one implementation, the sharpening filter $$p' = p + s(p - \text{blur}_{N,N}(p)) \quad (26)$$

Is applied to all channels of the pixel p. s can vary when iterating the interpolation step. The blur filter is applied to the N×N neighborhood centered at p, where N is odd. A reasonable filter to use is $$\frac{1}{16} \begin{bmatrix} 1 & 2 & 1 \\ 2 & 4 & 2 \\ 1 & 2 & 1 \end{bmatrix} \quad (27)$$

but almost anything that qualifies as a low-pass filter will work. It has been found that m∈(~1.1, ~1.9) and s≈2.0 work well for images with the above filter.

At 740, it is determined if a predetermined scaling has been achieved. If the predetermined scaling has not been achieved, the process of 720 and 730 may be iteratively repeated. Once the desired scaling has been achieved, the linear sharpened, directional interpolated pixel data for the plurality of blocks of pixel data is output as the scaled image.

The method of image scaling employing directional interpolation and sharpening without luminance clamping advantageously produces a scaled image that looks better at four-time (4×) and higher scaling, as compared to when luminance clamping is utilized.

Other scales may be obtained via a linear filtering step. For example, bilinear downscaling may be used for improved detail, or trilinear may be used if continuity between zooms is important. For a zoon factor of Z, in trilinear interpolation, $\log_2(Z) = \text{int} \cdot \text{fac}$ is calculated. The method of directional interpolation and sharpening without luminance clamping is the used to get two images a zooms $A=2^{int}$ and $B=2^{(int+1)}$, and linearly blending them together via A*(1−frac)+B*frac.

The coordinate system of the above described scaling techniques is not quite the same as linearly-scaled images. Therefore, when working with YUV images, with the above described methods scaling the Y channel and any suitable linear filter scaling the UV channels, the inverse mapping in the linear filer needs to support two different mappings for the zoom factor $Z=2^{n-\delta}$ (where $0 \le \delta < 1$ and n is an integer) to ensure that the UV channels are aligned correctly with the Y channel:

$$u_0 = 2^{-n+\delta} u_z \quad \text{(unmodified inverse mapping)} \tag{28}$$

$$u_0 = 2^{-n+\delta} u_z - 2^{-n-1} + 0.5 UV \tag{29}$$

$$u_0 = 2^{-n+\delta} u_z - 2^{-n-2} + 0.25 UV_{420} \tag{30}$$

wherein $u_0$ is the sample location in the source image corresponding to the sample location $u_z$ in the output image. The same equation applies to the v coordinate.

Embodiments of the present technology advantageously increase the speed of scaling images for a given rendering quality compared to conventional techniques. Embodiments of the present technology typically achieve performance in the gigapixel per second range and offers quality visibly superior to purely linear scaling on contemporary processing units. Embodiments of the present technology advantageously continue to generate interesting detail at any level of magnification The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A method comprising
receiving a plurality of blocks of pixel data of an image;
directionally interpolating the plurality of blocks of pixel data including
calculating metrics M45 and M135 as the sum of absolute difference of the luminances $$M_{45} = \sum_{45° \text{ pairs } i,j} |lum_i - lum_j|$$

$$M_{135} = \sum_{135° \text{ pairs } i,j} |lum_i - lum_j|$$

of diagonally-adjacent pixels for each block of pixel data;
color sharpening the directional interpolated blocks of pixel data;
iteratively repeating the combination of the directionally interpolating and color sharpening until a predetermined scaling has been achieved; and
outputting the color sharpened directional interpolated blocks of pixel data as a scaled image when the predetermined scaling has been achieved.

2. The method according to claim 1, wherein the direction of interpolation is chosen based upon the metrics $M_{45}$ and $M_{135}$.

3. The method according to claim 2, wherein directionally interpolating includes applying a linear filter when there metrics $M_{45}$ and $M_{135}$ fails to select the direction of interpolation.

4. The method according to claim 1, wherein color sharpening the directional interpolated blocks of pixel data includes applying a low pass filter.

5. A method comprising:
receiving a plurality of blocks of pixel data of an image;
directionally interpolating the plurality of blocks of pixel data including
calculating metrics $M_{45}$ and $M_{135}$ as the sum of absolute difference of the luminaces $$M_{45} = \sum_{45° \text{ pairs } i,j} |lum_i - lum_j|$$

$$M_{135} = \sum_{135° \text{ pairs } i,j} |lum_i - lum_j|$$

of diagonal pixels for each blocks of pixel data;
sharpening the directional interpolated blocks of pixel data;
clamping the sharpened, directional interpolated blocks of pixel data; and
outputting the clamped, sharpened, directional interpolated blocks of pixel data as a scaled image.

6. The method of according to claim 5, wherein directionally interpolating the plurality of blocks of pixel data includes applying a directional non-linear filter to the blocks of pixel data.

7. The method according to claim 5, wherein the direction of the interpolation is chosen based upon the metrics $M_{45}$ and $M_{135}$, and a linear filter is applied when the metrics $M_{45}$ and $M_{135}$ fail to select the direction of interpolation.

8. The method according to claim 5, wherein sharpening the directional interpolated blocks of pixel data includes applying a sharpening filter to the directional interpolated blocks of pixel data.

9. The method according to claim 5, wherein sharpening the directional interpolated blocks of pixel data includes applying a lowpass filter.

10. The method according to claim 5, wherein:
sharpening the directional interpolated blocks of pixel data comprises color sharpening of the directional interpolated blocks of pixel data; and
clamping the sharpened, directional interpolated blocks of pixel data comprises clamping the sharpened, directional, interpolated blocks of pixel data to its representable range.

11. The method according to claim 5, wherein:
sharpening the directional interpolated blocks of pixel data comprises luminance sharpening the directional interpolated blocks of pixel data; and
clamping the sharpened directional interpolated blocks of pixel data comprises clamping the sharpened, directional interpolated blocks of pixel data to a previous luminance value in a punctuated neighborhood of each respective block of pixel data.

12. A method comprising: receiving blocks of pixel data on an image;
receiving blocks of pixel data of an image;
receiving an image scaling factor;
directionally interpolating the blocks of pixel data, if the image scaling factor is greater than 1.0 and less than 2.0:
downsampling the directional interpolated blocks of pixel data, if the image scaling factor is greater than 1.0 and less than 2.0;

color sharpening the down sampled, directional interpolated blocks of pixel data, if the image scaling factor is greater than 1.0 and less than 2.0;

luminance clamping the color sharpened, downsampled, directional interpolated blocks of pixel data, if he image scaling factor is greater than 1.0 and less than 2.0;

outputting the luminance clamped, color sharpened, down sampled, directional interpolated blocks of pixel data as a scaled image, if the image scaling factor is greater than 1.0 and less than 2.0.

13. The method according to claim 12, wherein directionally interpolating the blocks of pixel data includes applying a directional non-linear filter, which upscales by a factor of two, to the blocks of pixel data.

14. The method according to claim 12, wherein directionally interpolating the blocks of pixel data includes the sum of absolute difference metrics $$M_{45} = \sum_{45° \text{ pairs } i,j} |lum_i - lum_j|$$

$$M_{135} = \sum_{135° \text{ pairs } i,j} |lum_i - lum_j|$$

of the pixel luminances.

15. The method according to claim 12, wherein color sharpening the directional interpolated blocks of pixel data includes applying a non-linear sharpening filter to the directional interpolated blocks of pixel data.

16. The method according to claim 12, wherein color sharpening the directional interpolated blocks of pixel data includes applying a low-pass filter.

17. The method according to claim 12, wherein luminance clamping the color sharpened, directional interpolated blocks of pixel data includes clamping the color sharpened, directional interpolated blocks of pixel data to the luminance range of the received blocks of pixel data of the image.

18. The method according to claim 12, further comprising:
directionally interpolating the block subpixel data, if the image scaling factor is equal to 2.0;
color sharpening the directional interpolated blocks of pixel data, if the image scaling factor is equal to 2.0;
luminance clamping the color sharpened, directional interpolated blocks of pixel data, if the image scaling factor is equal to 2.0; and
outputting the luminance clamped, color sharpened, directional interpolated blocks of pixel data as a scaled image, if the image scaling factor is equal to 2.0.

19. The method according to claim 12 further comprising:
directionally interpolating the blocks of pixel data, if the image scaling factor is greater than 2.0;
color sharpening the directional interpolated blocks of pixel data, if the image scaling factors greater than 2.0;
luminance clamping the color sharpened, directional interpolated blocks of pixel data, if the image scaling factor is greater than 2.0, to produce blocks of pixel data within inter-mediate image scaling;
iteratively performing the directional interpolating, color sharpening and luminance clamping, if the intermediate image scaling is not within the factor of 2 or less of the image scaling factor;
downsampling the directional interpolated blocks of pixel data with the intermediate image scaling, if the image scaling factor is greater than 1.0 and less than 2.0 of the image scaling factor,
color sharpening the downsampled, directional interpolated blocks of pixel data with the intermediate image scaling, if the scaling factor is greater than 1.0 or less than 2.0 of the image scaling factor;
luminance clamping the color sharpened, downsampled, directional interpolated blocks of pixel data with the intermediate image scaling, if the image scaling factor is greater than 1.0 and less than 2.0 of the image scaling factor; and
outputting the luminance clamped, color sharpened, down sampled, directional interpolated blocks of pixel data with the intermediate image scaling of a scaled image, if the image scaling factor is greater than 1.0 and less than 2.0 of the image scaling factor;
directionally interpolating the blocks pixel data with the intermediate image scaling, if the image scaling factor is equal to 2.0 of the image scaling factor;
color sharpening the directional interpolated blocks of pixel data with the intermediate image scaling, if the image scaling factor is equal to 2.0 of the image scaling factor;
luminance clamping the color sharpened, directional interpolated blocks of pixel data with the intermediate image scaling, if the image scaling factors equal to 2.0 of the image scaling factor; and
outputting the luminance clamped, color sharpened, directional interpolated blocks of pixel data with the intermediate image scaling as a scaled image, if the image scaling factors equal to 2.0 of the image scaling factor.

* * * * *